March 28, 1967 D. P. SCOTTO ETAL 3,311,326
FORCE DIRECTION INDICATOR AND APPARATUS
AND METHOD EMPLOYING SAME
Filed July 17, 1964 2 Sheets-Sheet 1

INVENTORS:
DOMINICK P. SCOTTO
THEODORE J. NEWMAN
BY Howson & Howson
ATTYS.

INVENTORS:
DOMINICK P. SCOTTO
THEODORE J. NEWMAN
BY Howson & Howson
ATTYS.

United States Patent Office 3,311,326
Patented Mar. 28, 1967

3,311,326
FORCE DIRECTION INDICATOR AND APPARATUS AND METHOD EMPLOYING SAME
Dominick P. Scotto, Plainview, and Theodore J. Newman, Forest Hills, N.Y., assignors to American Bosch Arma Corporation, Garden City, N.Y., a corporation of New York
Filed July 17, 1964, Ser. No. 383,425
4 Claims. (Cl. 244—3.20)

The present invention relates to apparatus and methods for detecting, and preferably for also controlling, the net force acting on a body, and more specifically relates to apparatus and methods for detecting and controlling thrust misalignment errors in thrust-propelled vehicles.

In controlling the flight of vehicles such as missiles or aircraft, successful operation is predicated upon the assumption that the direction of the net force constituting the propelling thrust is accurately known. For example, in the case of a ballistic rocket missile the direction and range of which is governed by initially aiming the missile on a launching track, successful flight to the target requires that a preconceived direction of propelling thrust on the missile will actually occur throughout the powered portion of the flight. However, due to such factors as deviation of the thrust vector of the propelling engines from the expected direction or application of unpredictable forces such as cross-winds to the vehicle during powered flight, an unpredictable angular misalignment generally occurs between the actual direction of propelling thrust and the preconceived or reference direction of thrust.

Even if the angular magnitude of the thrust misalignment error is small in absolute terms, it can produce serious disadvantages, or even failure of the flight mission, unless corrected. This is particularly true where a long flight is to be made to a small target area. Accordingly it is desirable to provide methods and apparatus for detecting the thrust direction and for correcting any thrust misalignment errors in an accurate and reliable manner. It is also desirable that the methods and apparatus utilized for this purpose be simple in construction and operation.

Accordingly it is an object of our invention to provide a new and useful method and system for reducing angular deviations between the direction of net force acting on a body and a predetermined reference direction in space.

Another object is provided a new and useful method and apparatus for providing indications of angular deviations between the net force applied to a body and a predetermined direction in space.

Another object is to provide a new and useful method and apparatus for maintaining the direction of propelling thrust applied to a vehicle, such as a missile or aircraft, along a predetermined direction.

A further object is to provide such apparatus, methods and systems which are simple, accurate and reliable in construction and operation.

The present invention accomplishes the above objects by suspending from a body subjected to a net accelerative force a pendulum comprising a pendulous member and a free gyro mounted on the pendulous member, and deriving signals indicative of angular deviations between the spin axis of the gyro and an axis fixed in the pendulous member. The gyro spin axis is set in a predetermined reference direction, normally prior to launching of the body, and, due to its inherent properties, maintains its spin axis parallel to this predetermined reference direction. The pendulum, when free, automatically aligns itself along the direction of the net force acting on the body, and the signals derived by detecting angular deviations between the gyro spin axis and the axis fixed in the pendulous member therefore constitute accurate indications of angular deviations between the direction of the net force and the reference direction in space. To employ these signals for guidance purposes, they are applied to a means for changing the direction in space of the net force on the body, preferably in a manner to reduce the angular deviation between the gyro spin axis and the axis in the pendulous member and hence to cause the net force on the body to act along the desired predetermined direction in space.

In a preferred form of the invention for controlling the flight of a vehicle such as a ballistic missile, the pendulum is installed on the vehicle prior to flight in a caged position with its axis aligned along the nominal or desired thrust direction for the vehicle, and the gyro is held caged to the pendulous member and brought up to speed in such manner that the spin axis of the gyro is aligned parallel to a line joining the center of suspension and the center of gravity of the pendulum. Just prior to launching, the gyro is uncaged. Unbalanced propelling thrust is then applied to the vehicle to launch it, and, shortly after launching, the pendulum is uncaged and aligns itself with the thrust vector, i.e. the direction of net force acting on the vehicle. Accordingly, with both the pendulum and the gyro uncaged during flight, the pendulum remains aligned with the thrust vector while the free gyro remains in its original orientation in space. Pick-off means operating between the gyro and the pendulous member then provide error signals indicative of the magnitude and sense of angular deviations between the gyro spin axis and the axis of the pendulous member, and hence indicate the magnitude and polarity of angular error between the propelling thrust vector and the nominal or desired flight direction parallel to the gyro spin axis. The error signals thus generated are supplied as control signals to an autopilot or similar apparatus to apply control forces for reducing the thrust misalignment error, for example by turning the entire vehicle or at least the motors of the vehicle. This reduces the error signal towards zero and aligns the propelling thrust vector parallel to the desired or nominal thrust direction. Close alignment of thrust with the desired direction of flight is thereby maintained throughout powered flight, whether the tendency toward error arises from the original misalignment of motor thrust with the vehicle, or from later-occurring unpredictable forces, such as cross-winds, acting on the vehicle during powered flight.

A principal advantage resulting from the above-described arrangement of the invention is that it eliminates any error which would arise due to mis-match of pick-off elements if a separate gyro and separate pendulum were used with two different pick-offs the outputs of which were compared, and also eliminates the addition of errors in instrument alignment which could occur if a separate pendulum and a separate gyro were used and had to be separately aligned with the vehicle initially.

Other objects and features of the invention will be more readily understood from a consideration of the following detailed description, taken in connection with the accompanying drawings, in which.

Figure 1:
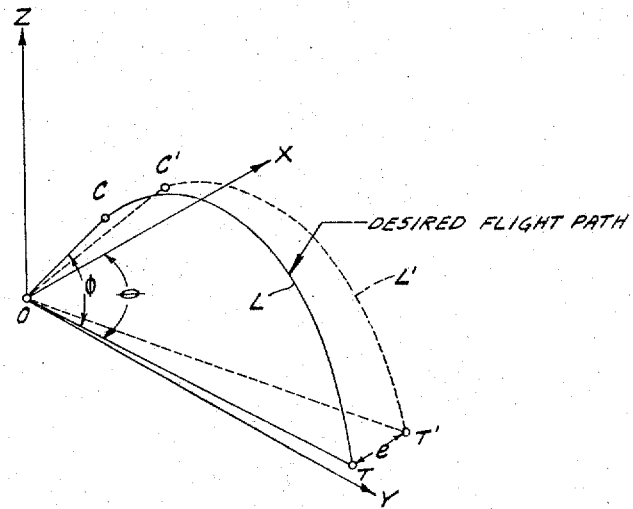
FIGURES 1, 2A, 2B, 2C and 2D are diagrammatic representations showing various missile flight paths, to which reference will be made in explaining certain purposes and functions of the invention.

Referring now particularly to FIGURE 1 of the drawings, there are represented therein the three mutually-orthogonal reference axes X, Y and Z extending from a common origin O. It is assumed that the origin O represents the launching site for a ballistic rocket missile intended after launchng to climb along the substantially straight slant line OC under propulsive power supplied by its rocket engines, the engines being cut off at the point C after which the missile is intended to travel ballistically between the point C and the point T representing the target and located in the horizontal XY plane. The solid curve L therefore designates the desired flight path of the missile from launching site O to target T. Assuming for simplicity that the X axis is horizontal and directed due north, the desired direction of the powered-flight path OC is defined by an azimuth angle $\theta$ between the X axis and a straight line joining O and T, and by an elevation angle $\phi$ between the powered-flight line OC and the horizontal XY plane.

It can be seen that ideally the missile can be caused to travel accurately to the target T by initially aiming it at a predetermined azimuth angle $\theta$ and at a predetermined elevation angle $\phi$, $\theta$ being determined by the azimuth direction of T with respect to O and $\phi$ being determined by the speed and time of powered flight from O to C and by the range between launching site O and target T, in known maner. However, this assumes that a missile initially aimed along the line OC will in fact travel along OC. In actual practice, a missile initially aimed directly at C from O tends to be deviated from its intended course by unpredictable forces acting thereon during powered flight which cause the net propulsive force acting on the projectile to occur in a direction other than along OC. For example, the flight instead may occur along the dotted line L' in FIGURE 1, the projectile then travelling from launching site O to the power-cutoff point C', displaced from C, and then continuing its ballistic flight to strike at a point T' very substantially displaced by an error distance $e$ from the desired target T. Such displacements are due to errors in the direction of net force acting on the projectile during powered flight, which may arise due to any of a variety of factors, principal among which are an unpredicted misalignment of the thrust vector of the missile engine with the fore-and-aft axis of the missile and severe cross-winds acting on the missile during powered flight. The general effect of such forces, and the general manner in which they are corrected in accordance with the invention, will be illustrated in connection with FIGURES 2A, 2B, 2C and 2D.

Figure 2A:
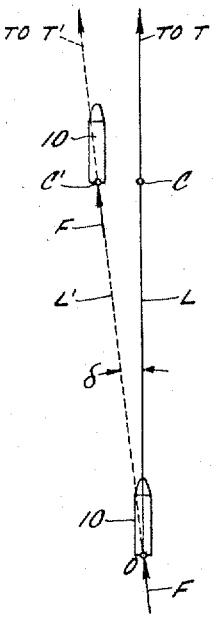

Referring to the latter four figures, each represents schematically a plan view of the type of projectile flight path shown in FIGURE 1, with the projectile shown at various positions in its flight. In FIGURE 2A, the projectile 10 is shown just after launching at the launching site O, where it has been aimed with its fore-and-aft axis directly aligned with the point C which it is intended to reach by powered flight, so that it will continue ballistically past C to the target T. Also shown is the thrust vector F due to the rocket motors, which is assumed to be many times greater than the gravitational force and hence constitutes in effect the net propulsive force on the missile. In this example the motor thrust vector F is directed not along the desired flight path L but along the flight path L' at an angle $\delta$ to the left of line L, as may occur due to some inadvertent angular misalignment of the engine apparatus by perhaps one or two degrees. The result of this is that while the missile 10 has the proper bearing, pointing toward the point C, it travels along the direction of the thrust vector F with a skidding or slewing motion so as to reach the point C' when power is cut off, after which it will continue ballistically toward the point T' substantially displaced from the desired target T. With target ranges of the order of many hundreds or even thousands of miles it can be seen that the displacement $e$ between the desired target point T and the actual impact point T' of the missile can be very large.

Figure 2B:
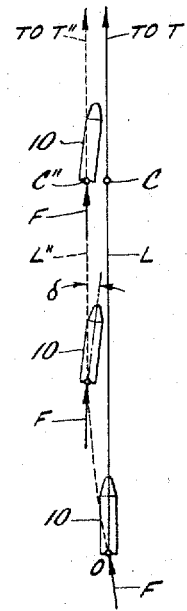

FIGURE 2B illustrates the case in which the same launching conditions exist as in FIGURES 2A, but in which the system of the invention has acted promptly to sense the angular misalignment $\delta$ between the desired flight path L and the motor thrust vector F, assumed in this case to be the net force acting on the missile 10, and to turn the fore-and-aft axis of missile 10 clockwise by the angle $-\delta$ until the motor thrust vector F becomes and remains substantially exactly parallel with the desired flight path L. As a result the missile 10 reaches the power-cutoff point C'' while travelling in a direction exactly parallel with the desired flight path L, as indicated by the dashed line L''. Accordingly it will proceed toward an impact point T'' displaced from the desired target T only by the very small lateral displacement between points C and C''. The latter lateral displacement is due to the small skidding, or slewing, motion of the missile occurring during the time in which the system of the invention is correcting the angular orientation of the fore-and-aft axis of missile 10; it will be understood that this displacement has been greatly exaggerated in FIGURE 2B and actually will be very small compared to the target error $e$ produced by the angular thrust misalignment in the situation represented in FIGURE 2A. Accordingly the system of the invention operates to reduce very greatly the error due to engine thrust misalignment.

Figure 2C:
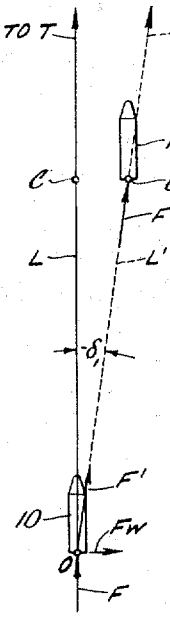

FIGURE 2C illustrates the case in which the missile 10 again is initially directed precisely along the desired flight line L toward the target T, and in this case the motor thrust vector F is assumed also initially to be aligned properly along line L. However, it is assumed in this case that a cross-wind, moving from left to right in the figure, applies a component force $F_w$ to missile 10 at right angles to the motor thrust vector F. Accordingly the resultant F' of the two forces F and $F_w$ represents the net force acting on the missile 10, and the missile therefore travels along the dashed line L' at an angle $-\delta_1$ with respect to the desired flight line L, although maintaining the same bearing of its fore-and-aft axis parallel to the line L. Accordingly the missile reaches the motor turn-off point C' while moving at a divergent angle with respect to the desired flight path, so as to be headed toward a landing point T' which may be widely displaced from the desired target area T.

Figure 2D:
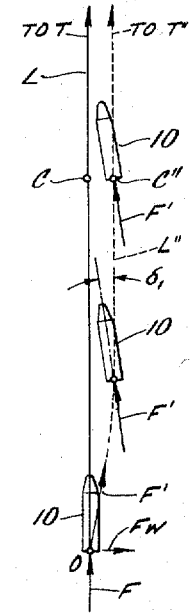

FIGURE 2D represents the same initial conditions as are shown in FIGURE 2C, and assumes the existence of the same cross-wind force as is assumed in connection with FIGURE 2C. However, in this case the system of the invention has turned the fore-and-aft axis of missile 10 counterclockwise by the angle $\delta_1$ so that, shortly after launching, the net force F' is directed along the corrected course line L'' parallel to the desired flight path L. The missile therefore reaches the power-cutoff point C'' while travelling in a direction such as to land at an impact point T'' displaced from the desired target area T only by the very small fixed sideward displacement generated during correction of the missile orientation, the latter displacement having again been exaggerated in the figure.

In the particular application of the invention described with respect to FIGURES 2A, 2B, 2C and 2D it is assumed that flight corrections can be made only during the powered phase of the flight and therefore cross-winds or other unpredictable forces acting beyond the power-cutoff point will tend to produce some error in striking the target with the missile. However, the total error for the complete flight is greatly reduced by the operation of the system of the invention, as will be seen from the foregoing description.

It is noted that the system of the invention responds to the net force acting on the missile, corrects deviations of the direction of the net force from the desired flight direction regardless of the source of the forces, and therefore operates in the manner described above when deviation of the direction of the net force from the desired direction is due to any combination of motor thrust misalignment and cross-wind forces. It is understood that a similar problem of inaccuracy in striking the target with the missile arises when the angular misalignment of the net force, including a component thereof due to gravity, is partly or completely in elevation rather than in azimuth only, and that such misalignment is susceptible of correction by the system of the invention by sensing and correcting elevational errors in the same general manner described above for the case of azimuth errors.

As described previously, the invention involves apparatus for detecting and producing error signals indicative of angular deviations, such as $\delta$ and $\delta_1$, between the net force acting on the missile and a predetermined nominal direction corresponding in this case to the desired direction of missile flight. These signals are used to control changes in the orientation of the missile so as to align the net force propelling the missile along the desired direction. The arrangement for sensing these angular deviations in accordance with the invention is illustrated schematically in FIGURES 3A, 3B and 3C.

Figure 3A:
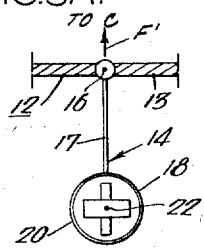
FIGURES 3A, 3B and 3C are schematic representations of an indicator of the direction of net force operating in accordance with the invention, to which reference will be made in explaining the principle of the invention.
Figure 3B:
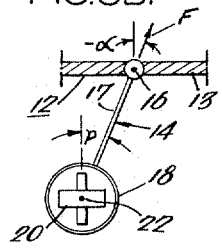
Figure 3C:
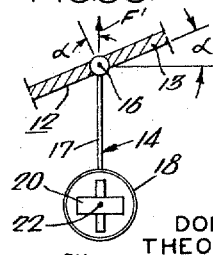

FIGURES 3A, 3B and 3C are schematic plan views of the indicator of direction of net force, or vehicle thrust, illustrating the operation for azimuth-angle variations only, it being understood that a similar operation occurs in the elevation-angle plane. Referring first particularly to FIGURE 3A, frame 12 is fixed to missile 10 and has a reference surface 13 perpenidcular to the fore-and-aft axis of the missile. In this figure it is assumed that the net force F' is acting perpendicular to the surface 13 and is directed precisely toward the desired motor cut-off point C. A pendulum 14 is suspended from the frame 12 to pivot freely in the plane of the diagram about the suspension axis 16. The pendulum 14 comprises a pendulous member, made up of a pendulum arm 17 and a pendulum bob 18, and a free gyro 20 mounted on the bob and having its spin axis aligned with an axis in the pendulous member which extends from the center of gravity 22 of the pendulum to the center of pivot axis 16. The spin axis of the gyro is directed toward the desired motor cut-off point C, having been so set initially, while the axis of the pendulum extending between points 22 and 16 has aligned itself with the net force F' because of the well-known inherent properties of a free pendulum. The situation depicted in FIGURE 3A therefore corresponds to the condition in which the missile 10 is moving along the intended flight direction toward motor cut-off point C.

In FIGURE 2B all elements are the same as in FIGURE 2A, but in this case it is assumed that, due to some factor such as motor thrust misalignment of the missile or strong cross-winds acting on the missile, the direction of the net force F' deviates clockwise from the desired direction by the angle $-\alpha$. Under these conditions the pendulum axis aligns itself with the new direction of net force F' as shown, while the gyro spin axis, due to the inherent properties of a free gyroscope, maintains the direction of its spin axis unchanged, and hence remains directed along the desired flight direction. There is therefore produced an angular deviation $p$, equal to the net-force misalignment angle $-\alpha$, between the pendulum axis and the spin axis of the gyro. In accordance with the invention this angular deviation $p$ is detected by appropriate pick-off means acting between the pendulous member and the gyro. Preferably this pick-off means is such as to produce a zero output electrical signal in the case shown in FIGURE 3A, to produce an output electrical signal having a given polarity for the angular direction of deviation between pendulum axis and gyro spin axis shown in FIGURE 3B, and an opposite polarity of electrical signal for cases in which the net force F' deviates from the desired flight direction in the opposite angular direction. This signal is then used to turn the missile to return the net force toward the desired direction. For example, when conditions are such as to tend to produce the direction of net force F' shown in FIGURE 3B, the control signals derived from the pick-off acting between the pendulous member and the gyro are applied to missile-turning elements, such as rudders are angular correction jets, to turn the frame 12 counterclockwise until the direction of the net force F' has also turned counter-clockwise in direction by substantially the angle $\alpha$, at which time it is directed along the desired flight path, as shown in FIGURE 3C. While this turning of the missile is occuring, the direction of the pendulum axis inherently remains aligned with the instantaneous direction of net force F', and hence returns to the position represented in FIGURE 3A when the correction is completed. The angular deviation between the gyro spin axis and the pendulum axis is thereby returned toward zero, and the pick-off signals also approach zero. The system therefore operates as a null-seeking, closed-loop servo-system, constantly correcting for any misalignment between net force and desired flight direction by turning the missile. Should any further angular deviations occur or tend to occur in either sense, they will be minimized and corrected in the same manner.

Furthermore, it will be understood that the pendulum is preferably mounted so that it is not limited to aligning itself with net forces deviating only in azimuth from the desired direction of flight, but can also align itself with deviations in elevation or with deviations which are partially in azimuth and partially in elevation, and by providing adequate pick-off means for detecting not only the amount but the direction of such angular deviations, the necessary correction can be effected by re-orienting the missile in azimuth, in elevation or in a combination of azimuth and elevation directions.

Figure 4:
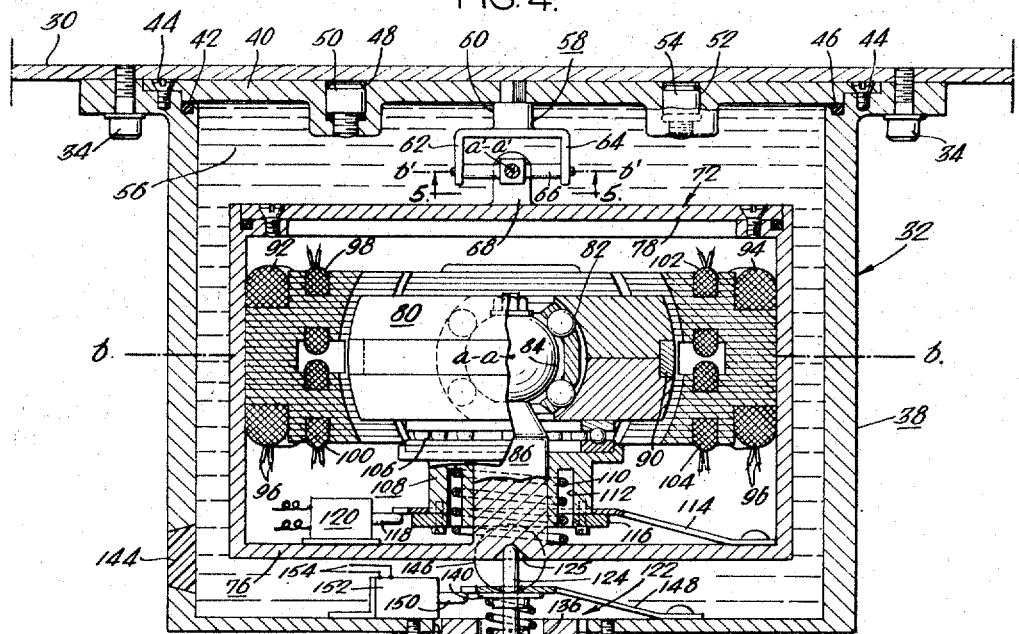
FIGURE 4 is a sectional view of one specific embodiment of force-sensing apparatus in accordance with the invention.

Referring now to FIGURE 4 for a description of a specific embodiment of an indicator of direction of net force, constructed in accordance with the invention, it will be understood that the embodiment represented therein has been simplified in the interests of clear exposition of the inventive structure and principle, and that the many well-known refinements in technique and construction which are typically utilized in high-quality inertial instruments have not been shown since they would tend to render the description unclear and unnecessarily prolix, and since such refinements will readily occur to one skilled in the art and practicing the invention.

In FIGURE 4 there is shown a support member 30 which typically is a plate mounted in a missile exactly perpendicular to the fore-and-aft axis of the missile. The force-direction indicator 32 is supported on the under-surface of support member 30 by means of screws such as 34 which pass through a peripheral flange on an outer fluid-tight housing 38 of the indicator. The housing 38 may, for example, be in the form of a cylindrical metal can having an openable top and which, during the operation of the indicator, is closed by a circular cover 40 held tightly against an appropriately-recessed shoulder 42 extending around the top of the housing 38. For fluid-tight closure, the cover 40 may be held down tightly by screws such as 44 against a sealing O-ring 46.

The top cover 40 includes a fluid-filling aperture 48 sealed shut by a removable threaded plug 50, and an air vent aperture 52 sealed by a threaded plug 54, both plugs when installed being recessed below the upper surface of cover 40 so as not to interfere with its flush mounting on the undersurface of support member 30. The housing 38 can then readily be filled with a fluid 56 by way of aperture 48 while air is permitted to escape by way of aperture 52.

Figure 5:
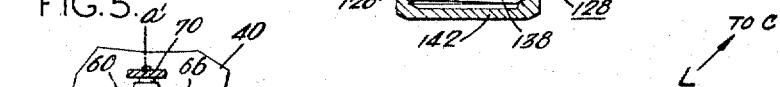
FIGURE 5 is a fragmentary sectional view taken along line 5—5 of FIGURE 4.

Secured to and depending from the lower surface of cover 40 is a universal or Hooke's joint 58, shown in bottom view in FIGURE 5. The upwardly-extending stem 60 of universal joint 58 is so secured to cover 40 that it is fixed against rotational motion therein. The construction and operation of such joints are well known in the art and need not be described herein in detail. Briefly, in the present example the stem 60 is integral with a pair of downwardly-extending yoke arms 62 and 64 between which the center piece 66 is mounted on appropriate low-friction bearings so as to rotate freely about an axis $b'b'$. The center piece 66 also extends transversely to the axis $b'b'$ and has a pair of support arms 68 and 70 mounted at opposite ends thereof in appropriate low-friction bearings to provide a pivot axis $a'a'$ perpendicular to the pivot axis $b'b'$. The support arms 68 and 70 may be considered as the arms of a pendulum, the pendulum bob 72 of which comprises the fluid-tight casing 76 and the gyroscope apparatus therein. The combined effect of the mutually perpendicular pivot axes $a'a'$ and $b'b'$ is to permit the pendulum bob 72 to move or swing not only normal to the pivot axes $a'a'$ and $b'b'$ but also in effect about any intermediately-oriented axis. While the bob is therefore free to swing in any plane passing through the center of suspension 77 of the universal joint, the construction is such that the pendulum bob 72 is fixed against rotation about a vertical axis with respect to support member 30, and hence also with respect to the missile on which it is carried. The significance of this arrangement will become more apparent hereinafter.

The outer fluid-tight casing 76 of bob 72 may be in the form of a cylindrical can having a removable sealed top cover 78 to which the arms 68 and 70 of universal joint 58 are secured. A two-degree of freedom gyro comprising an intertia wheel 80 is mounted within casing 76 on a spherical ball-bearing 82, the inner spherical race 84 of which is fixedly supported, as by a nut and bolt construction, at the upper surface of a generally-cylindrical support member 86 secured to the bottom of casing 76. In this embodiment the longitudinal axis of the cylindrical support member 86 is preferably aligned with the center of suspension 77 of universal joint 58, and the bearing 82 and wheel 80 are also preferably symmetrically disposed with respect to the axis of member 86. The spherical bearing 82 permits rapid, low-friction rotation of wheel 80 about a spin axis aligned with the center of suspension 77, and also permits limited, low-friction tilt of the spinning inertia wheel 80 about each of two axes $aa$ and $bb$ perpendicular to each other and to an axis through the center of gravity of bob 72 and the center of suspension 77. The gyro therefore has two degree of freedom for tilting of the plane in which it spins, within limits of angle of tilt.

Rotation of the wheel 80 about its spin axis is provided by electric motor means in bob 72, comprising a stator structure fixed to the inner side walls of casing 76 and surrounding inertia wheel 80 and a hysteresis ring 90 encircling the center of the outer rim of the wheel. The stator structure preferably comprises diametrically-opposed motor windings 92 and 94 wound on laminated core material, and another pair of diametrically-opposed motor windings (not shown) spaced circumferentially around wheel 80 by 90° from windings 92 and 94. Appropriate alternating currents are applied to the motor winding leads such as 96 of each of the motor windings so as to produce a rotating magnetic flux which acts on the hysteresis ring 90 to spin the gyro wheel 80 in known manner.

To sense angular tilt of gyro wheel 80 about the axis $aa$, perpendicular to the plane of FIGURE 4, there are provided pick-off coils 98 and 100 at the left of the wheel and pick-off coils 102 and 104 at the right. Two similarly diametrically-opposed pairs of pick-up coils are provided at points spaced circumferentially by 90° from the above-described pick-off coils for the purpose of sensing tilt of wheel 80 about the $bb$ axis. Conveniently the pick-up coils are wound on the same laminated core structure of the stator assembly as are the motor windings. Each set of pairs of diametrically-opposed pick-up coils is preferably electrically interconnected to produce an induced voltage across a corresponding pair of leads which is zero when the spin axis of wheel 80 is normal to both axes $aa$ and $bb$, which is of a given polarity and of increasing value as the spin axis tilts in one sense about one of the axes $aa$, $bb$, and is of the opposite polarity and increasing value for the opposite direction of tilt of wheel 80.

The construction and operation of the electrical motor apparatus for driving the gyro wheel 80 about its spin axis, and of the pick-up coil arrangement for sensing tilt of the spin axis of the gyro and for producing two separate electrical signals indicative of tilts of the wheel about two mutually perpendicular axes, are not set forth herein in great detail for the reason that they are well known in the art and, for example, may be constructed and operated as shown and described in U.S. Patent No. 3,107,540, of L. E. Curriston, issued Oct. 22, 1963, the pertinent disclosure of which is incorporated herein by reference.

Appropriate apparatus is also provided for releasably caging the inertia wheel 80 to bob casing 76 with its spin axis accurately aligned with the center of gravity of bob 72 and the center of suspension 77. In the present example the gyro caging is provided by a thrust ball-bearing 106 secured to the upper surface of a collar 108 axially slidable on, and concentric with, the cylindrical support member 86. The bearing 106 is secured to collar 108 by its lower race, the upper race having a flat caging surface adapted to bear against a flat undersurface of inertia wheel 80 when urged upward against it to cage the wheel in the above-described desired position. Collar 108 and bearing 106 are urged upwardly into caging position by a coil spring 110 acting between the lower surface of casing 76 and the upper end of a channel 112 in collar 108. Uncaging of inertia wheel 80 is provided by the uncaging spring 114, which may be a leaf spring secured to the bottom of casing 76 and bearing downwardly upon a shoulder 116 on collar 108. Spring 114 is prevented from uncaging wheel 80 by a latch member 118 mounted on the bottom of casing 76 and supporting the bottom surface of spring 114, except when the latch member 118 is retracted by a solenoid device 120 in response to electrical current through the solenoid device, at which time the spring 114 is free to move the collar and bearing assembly downward to uncage the wheel 80.

The various electrical leads from the gyro windings, from the pick-off windings and from solenoid 120 are brought out from the interior of bob 72 to the exterior of housing 38 in a manner such as not to interfere with freedom of motion of the bob 72 about the center of suspension 77. The details of the lead arrangement are not shown in the drawing since they will readily occur to one skilled in the art and do not constitute the subject matter of the present invention; similar problems are commonly encountered and provided for in many instances in which electrical power leads must be supplied to a gyro motor mounted on a universal joint. In general, the lead wiring may exit from bob 72 through a sealed bead in cover 78 near arm 68 and, using highly flexible conductors, be loosely coiled around the center piece 66 of universal joint 58 from where it may proceed to the exterior by way of an appropriately-sealed bead in cover 40 and a hole in support member 30.

Additional caging means 122 are also provided for caging the pendulum to the housing 38 with the axis of the pendulum disposed perpendicular to the support member 30. As shown in FIGURE 4, the caging mechanism comprises a cylindrical pin 124 having a tapered end which fits within a conical recess 125 at the center of the bottom of casing 76. The pin 124 is held perpendicular to support member 30 by its slidable fits in the vertical bore 126 of the pin adapter 128. The pin adapted 128 is provided with a peripheral flange 130 by which it is secured to the underside of housing 38, by means of screws such as 132. A suitable aperture 134 in the lower side of housing 38 is provided to accommodate the pin adapter. Pin adapter 128 is provided with an appropriate cylindrical channel 136 in which there is retained a coil spring 138 encircling pin 124 and bearing upward against the lower surface of a disc 140 attached to the pin at right angles thereto. Pin 124 therefore normally holds the bob 72 in a caged position with respect to housing 38 through the action of coil spring 138.

In order to adjust the position in which the bob 72 is held caged by pin 124, the pin adapter 128 is made laterally adjustable in position by providing adequate clearance for its in the aperture 134 at the bottom of housing 38 and also adequate clearance around the screws 132 in the peripheral flange 130. With the threaded sealing cap 142 removed from the bottom of pin adapter 128, and with screws 132 loosened, the lower end of pin 124 extending below adapter 128 can be pulled downwardly to free the pin 124 from the surface of recess 125, the pin adapter 128 moved laterally, after which the pin may be released again to cage the bob. By repeating this sequence and observing the bob by way of plastic windows 144 and 146 disposed at 90° from each other around the housing 38, a position for pin 124 can be found in which caging of the bob does not disturb the bob from its freely-hanging position with support frame situated horizontal. With the pin adapter in the latter position for which motion of the bob does not occur upon caging, the screws 132 may be tightened to hold the pin adapter 128 in fixed position on housing 38. In the latter condition it is assured that the bob is caged so that the line joining its center of gravity with the center of suspension 77 is exactly perpendicular to support member 30 and hence is aligned with the fore-and-aft axis of the missile on which support member 30 is mounted. Cap 142 can then be replaced to assure proper fluid sealing of housing 38.

Electrically-controlled uncaging of the bob 72 from housing 38 is provided by a leaf spring 148, secured to the inside of the bottom of housing 38 and bearing downwardly against the top of the disc 140 on pin 124. During times when the bob is to remain caged, spring 148 is prevented from exerting such downward force by a latching member 150 which bears against the lower surface of the latter spring. However, when the bob is to be uncaged, an electrical current supplied to solenoid 152 causes latching member 150 to retract and to permit spring 148 to uncage the bob. The solenoid actuating leads 154 may be run along the inside edge of the housing 38 to the cover 40 and passed through the cover and the supporting frame 30 in the same manner as those leads which communicate with the interior of bob 72 as described above.

It should be understood that the particular forms of caging mechanism shown in FIGURE 4 are merely illustrative, and have been chosen for simplicity and exposition. The art of gyroscope caging is well-developed and refined, and for accurate caging considerably more complicated arrangements may be employed than that shown in the figure.

The fluid 56 contained within housing 38 has a viscosity chosen to provide the desired damping of motion of the pendulum when freely swinging. Also, because of its density it provides a buoyant action on bob 72 affecting the natural period of vibration of the pendulum. It will be understood that for operation on a missile it is generally desired that the pendulum be capable of sufficiently swift movement to follow abrupt changes in missile orientation, yet reach its final position without undue oscillations, and at the same time not be unduly susceptible to the vibrations of the missile during powered flight. In addition, there are limitations on the size and mass distribution of the pendulum; for example, it must be large enough to provide for a satisfactory operating gyroscope therein but not so large as to require an undue amount of room in the missile. The characteristics of the fluid 56 are therefore chosen in accordance with these considerations relating to pendulum period and damping characteristics to obtain the best results for the particular application. Typical fluids for this purpose include the silicones and fluorolubes, which are available in a variety of viscosities and densities. It is also contemplated that the dynamic characteristics of the pendulum can be modified, if desired, by attaching additional buoyant chambers to it.

The adjustment, installation, operation and use of the net-force direction indicator of FIGURE 4 may then be as follows. Starting with the apparatus disassembled, with casing cover 78 removed the internal parts of bob 72 are installed within casing 76, with inertia wheel 80 caged with its spin axis normal to the bottom of casing 76 and the pick-off means such as 98, 100, 102 and 104 arranged so that they produce no net electrical output in this position of the wheel. Universal joint 58 is assembled to cover 40 so that its pivot axes $a'a'$ and $b'b'$ are parallel to cover 40 and the cover 78 suspended from universal joint 58 is secured on top of, and parallel to the bottom of, casing 76. With the bob caging pin 124 withdrawn, the pendulum assembly is lowered into housing 38, and cover 40 is secured to the top of the latter housing, the cover 40 and the bottom of housing 38 then being parallel to each other and to the top and bottom surfaces of bob 72. The complete indicator is then bolted to the underside of a horizontally-disposed surface which simulates support frame 30 and, with cap 142 removed, the above-described withdrawal, lateral adjustment and replacement of caging pin 124 is performed repeatedly until, as observed by way of plastic windows 144 and 146, replacement of pin 124 produces no deviation of bob 72 from its freely-suspended position. At this time the screws 132 are tightened to fix adapter 128 in position and cap 142 replaced. The threaded plugs 50 and 54 are then removed, fluid 56 is poured into housing 38 until it is full, and then both plugs are screwed tightly into place. The assembled indicator then stands caged and ready for mounting on the support member 30 in a missile such as missile 200 of FIGURE 6.

Figure 6:
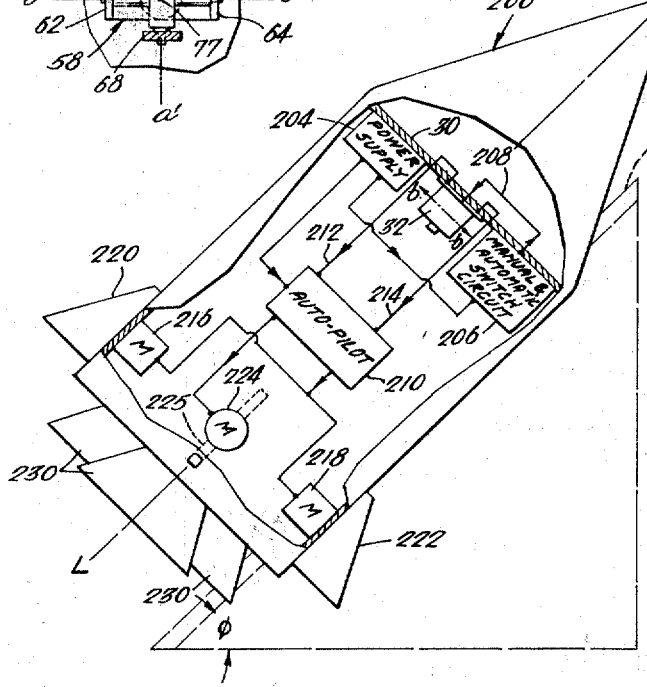
FIGURE 6 is a schematic representation, partly in section, of a system for controlling the flight of a projectile in accordance with one form of the invention.

Referring now to FIGURE 6, the missile 200 is shown in place on a launching track 202 and contains the force-direction indicator 32 of FIGURE 4 mounted on the supporting frame 30 therein. During construction of the missile, the supporting frame 30 is fabricated so that the surface thereof on which indicator 32 is mounted is accurately perpendicular to the fore-and-aft axis LL of missile 200. By adjustment of the azimuth and elevation angle of the track 202, the fore-and-aft axis LL is aimed directly at the desired motor cut-off point in space, designated as C in FIGURE 1. Accordingly the spin axis of the gyro and the axis of the pendulum in indicator 32 are also aligned, in caged position, along this desired line of flight.

Missile 200 contains an electrical power supply 204 which supplies electrical input power to force-direction indicator 32 by way of manual and automatic switch circuit 206. The latter circuit permits appropriate electrical power to be manually or automatically applied to, or disconnected from, the gyro driving motor and the two solenoid uncaging elements 120 and 152 in indicator 32 by way of line 208. The automatic switches included therein may for example be of a time delay variety, or of an inertia type responsive to acceleration of the missile.

Power supply 204 also supplies operating power to an autopilot 210, which is controlled by a first input signal supplied over a line 212 and representative of tilt of the gyro wheel 80 about the axis *aa*, and by another input signal supplied thereto over a second line 214 and representative of tilt of the gyro wheel 80 about the axis *bb*. One of the two outputs of the autopilot is supplied to a first pair of motors 216 and 218 which operates a corresponding first pair of rudder devices 220 and 222 for turning the missile about a first axis parallel to axis *bb* in an angular sense determined by the polarity of the output signal from the autopilot; another output of the autopilot is supplied to another pair of diametrically-opposed motors, such as 224, which operate a second pair of rudder devices such as 225, spaced circumferentially by 90° around the missile from the rudder devices 220 and 222. The second pair of rudder devices operate to turn the missile about an axis parallel to the axis *aa* in a sense determined by the polarity of the corresponding output signal from the autopilot.

The nature of an appropriate autopilot, motor and rudder control system suitable for this purpose will be apparent to one skilled in the art. It will be understood that the nature of the operation of the autopilot and rudders is such as to turn the missile in that direction which will correct any misalignment between the axis of the pendulum and the spin axis of the gyro in indicator 32.

Prior to launching of the missile, the switch circuit 206 is operated so as to bring the inertia wheel 80 up to operating speed while caged, after which it is uncaged by manual or automatic switching of current to solenoid device 120. The missile is then launched along the line LL by starting of the rocket motors 230 attached to the rear of the missile. Immediately after launch, the switch circuit 206 automatically operates to control the current to solenoid device 152 so as to unlatch the bob 72 of the pendulum in indicator 32, for example by means of an inertia switch. As the missile accelerates from its launching site, the axis of the pendulum in indicator 32 will align itself accurately with the net accelerative force acting on the missile. If this net force is directed accurately along the desired flight path, the pendulum will not move angularly from its initial position and the spin axis of the gyro wheel 80 will remain aligned with the line joining the center of gravity and the center support of the pendulum; accordingly no output signal will be developed by the gyro pick-off windings and the autopilot will not be actuated.

However, if the net force acting on the missile to propel it is angularly displaced from the preselected flight path, due for example to misalignment of the rocket-engine thrust or strong cross-winds, the pendulum will swing on universal joint 58 to a new steady state position in alignment with the net force on the missile. The gyro spin axis, however, remains parallel to the original flight direction, and the resultant angular tilt between the gyro wheel 80 and the pick-off windings attached to the pendulum bob 72 will produce error signals which are supplied by one or both of lines 212 and 214 to autopilot 210, and the autopilot responds thereto to actuate the missile rudder devices so as to turn the missile toward the direction which brings the net force parallel to the desired flight line. As the latter condition is approached, the output of the gyroscope pick-off windings approach zero, so that the motors controlling the rudders are de-energized and turning force on the missile removed. Any further turning forces acting on the missile, whether due to engine misalignment, cross-winds, or tendencies for the missile orientation to overshoot the desired direction, will be corrected by the autopilot in the usual manner of operation of a null-seeking closed-loop servo-system. Accordingly the missile will be controlled to travel along the direction of the desired powered flight path to the motor cut-off point, and errors in striking the intended target will be greatly reduced.

It will be understood that the net-force direction indicator of the invention may be utilized in a large variety of applications, not only in missile guidance but in other fields as well.

While the invention has been described with specific reference to particular embodiments thereof in the interests of complete definiteness, it will be understood that it may be embodied in any of a large variety of other forms without departing from the scope and spirit of the invention as defined by the appended claims.

We claim:

1. A system for maintaining the net thrust on a vehicle along a predetermined direction in space, comprising:
   a pendulum support on said vehicle providing first and second pendulum pivot axes at right angles to each other and fixed with respect to said vehicle;
   a pendulum suspended from said support and comprising a pendulous member and a free gyro thereon, said free gyro including an inertia wheel having its spin axis oriented along said predetermined direction in space;
   pick-off means acting between said wheel and said pendulous member for producing control signals indicative of angular deviations between said wheel and an axis fixed in said member about a pair of axes perpendicular to said spin axis and to each other;
   means for applying to said vehicle a force of controllable magnitude and direction; and
   control means responsive to said signals for controlling said force-applying means to turn said vehicle in a direction to align said spin axis parallel to said axis in said pendulous member.

2. Apparatus for producing signals indicative of deviations from a predetermined direction of the net thrust on a body, comprising:
   a member pendulously suspended on said body for free angular motion about at least one suspension axis substantially perpendicular to said predetermined direction;
   a gyro supported on said member and having its spin axis directed substantially parallel to said predetermined direction, the spin axis of said gyro, when uncaged, being free to tilt with respect to said member about at least one axis substantially parallel to said suspension axis of said member; and
   gyro pickoff means on said member for producing signals indicative of the sense and magnitude of angular displacements between said member and said spin axis.

3. Apparatus in accordance with claim 2, in which said member is pendulously supported for free oscillation about each of two mutually perpendicular axes, in which said spin axis of said gyro is free to tilt about two axes perpendicular to said spin axis and to each other, and in which said pickoff means is responsive to said angular displacements to produce signals indicative of the direction of tilt of said spin axis of said gyro with respect to said member.

4. Apparatus for maintaining flight of a projectile along a predetermined direction, comprising:
   a member pendulously supported for free oscillation on said projectile, said member comprising a two-degree of freedom gyro mounted thereon;
   means for initially caging said pendulously supported member to said projectile and for initially caging said gyro to said member while imparting spin to said gyro about a spin axis oriented along said predetermined direction;
   means for uncaging said gyro from said member;
   means for uncaging said member after launching of said projectile to permit said member to align its pendulous axis with the direction of net force on said projectile;

means for deriving signals representative of angular deviations between said member and said gyro spin axis;

means for applying a force of controllable direction to said projectile; and means for controlling the direction of said force applied to said projectile in response to said signals to reduce said deviations toward zero, after said uncagings of said member and said gyro.

References Cited by the Examiner

UNITED STATES PATENTS

| | | | |
|---|---|---|---|
| 1,973,042 | 9/1934 | Boykow | 244—79 |
| 2,822,755 | 2/1958 | Edwards | 102—50 |
| 2,879,668 | 3/1959 | Mleczko | 74—5.4 |
| 3,146,530 | 9/1964 | Clark et al. | 74—5 X |

BENJAMIN A. BORCHELT, *Primary Examiner.*

V. R. PENDEGRASS, *Assistant Examiner.*

UNITED STATES PATENT OFFICE
CERTIFICATE OF CORRECTION

Patent No. 3,311,326                          March 28, 1967

Dominick P. Scotto et al.

It is hereby certified that error appears in the above numbered patent requiring correction and that the said Letters Patent should read as corrected below.

Column 4, lines 14 and 15, for "many hundreds or even thousands" read -- hundreds --; column 6, line 24, for "along" read -- parallel to --; line 28, after "position" insert -- relative to the gyro spin axis which is --; column 7, line 60, for "degree" read -- degrees --; column 9, line 8, for "fits" read -- fit --; line 9, for "adapted" read -- adapter --; line 24, for "its" read -- it --.

Signed and sealed this 7th day of November 1967.

(SEAL)
Attest:

Edward M. Fletcher, Jr.                        EDWARD J. BRENNER
Attesting Officer                             Commissioner of Patents